(12) United States Patent
Cerf

(10) Patent No.: US 6,242,888 B1
(45) Date of Patent: Jun. 5, 2001

(54) OPTIMIZATION OF MOBILE STATION BATTERY CHARGING WITH A TWO SLOT CHARGER BY SHARING A CHARGING PERIOD

(75) Inventor: Patrice Cerf, San Diego, CA (US)

(73) Assignee: Nokia Mobile Phones, Espoo (FI)

( * ) Notice: Subject to any disclaimer, the term of this patent is extended or adjusted under 35 U.S.C. 154(b) by 0 days.

(21) Appl. No.: 09/583,036

(22) Filed: May 30, 2000

(51) Int. Cl.[7] .................................. H02J 7/00; H02J 7/14
(52) U.S. Cl. ............................................. 320/119; 320/139
(58) Field of Search .................................... 320/119, 121, 320/139, 133, 155

(56) References Cited

U.S. PATENT DOCUMENTS

| | | | |
|---|---|---|---|
| 3,911,350 | * 10/1975 | Swope | 320/154 |
| 5,028,859 | * 7/1991 | Johnson et al. | 320/125 |
| 5,955,867 | * 9/1999 | Cummings et al. | 320/107 |
| 6,160,378 | * 12/2000 | Helot et al. | 320/119 |

* cited by examiner

*Primary Examiner*—Edward H. Tso
*Assistant Examiner*—Gregory J. Toatley, Jr.

(74) *Attorney, Agent, or Firm*—Ohlandt, Greeley, Ruggiero & Perle, LLP

(57) ABSTRACT

A battery charging station includes a first charging circuit for charging a first battery, a second charging circuit for charging a second battery and circuitry that is responsive to a pulse width modulated signal that defines a plurality of repeating charging periods, for selectively allocating, during a single one of the charging periods, battery charging energy first to one of the first charging circuit or the second charging circuit, and then to the other charging circuit. The PWM signal is preferably received from an external battery charging circuit associated with the first battery, and during a single one of the charging periods the battery charging energy is applied first to the first charging circuit and then, if at least one criteria is met, to the second charging circuit. The at least one criteria can include an ability to develop a minimum charging voltage to the second battery during the amount of time remaining within the current charging period, after applying charging energy to the first battery. The first battery may be installed within a device, such as a cellular telephone or a personal communicator, and the PWM signal is received from a battery charging circuit installed within the device and the second battery is located within a (spare) battery pack. During a single one of the charging periods the battery charging energy is applied first to the first charging circuit for recharging the first battery and then is selectively applied to the second charging circuit for recharging the second battery.

15 Claims, 3 Drawing Sheets

IMPLEMENTATION AS 2 SEPARATED VOLTAGE GENERATORS

OPTIMIZATION OF MOBILE STATION BATTERY CHARGING WITH A TWO SLOT CHARGER BY SHARING A CHARGING PERIOD

FIELD OF THE INVENTION

This invention relates generally to battery charging methods and apparatus and, more particularly, relates to battery chargers operating with a pulse width modulator (PWM) for simultaneously charging a first battery and a second battery, wherein either the first battery or the second battery is installed within a battery-powered device, such as a communication user terminal including cellular telephones and personal communicators.

BACKGROUND OF THE INVENTION

Referring to FIG. 1, it is known to provide a desktop battery charger station 1 having a first slot 2, sometimes referred to as a "front-slot", for receiving a cellular telephone 6 and a second slot 3, sometimes referred to as a "back-slot", for receiving just a battery module or pack 5 of the cellular telephone. In this manner the user is enabled to recharge the battery pack that is currently installed within the phone 6 by inserting the base of the phone 6 into the first slot 2, while a spare battery pack 5 is installed within the second slot 3. A connection 4 is provided for coupling the charger station 1 to a source of electric power. The charger station 1 can contain a PWM circuit for selectively applying charging pulses to the phone's battery pack and to the back-slot battery pack. Alternatively, PWM signals can be obtained from the charging circuitry (CC) 7 contained within the phone 6. Some phones are also known that contain a switch (SW) in series with the battery, where the switch is opened and closed by the charging circuit 7 at, for example, a 1 Hz rate. When the switch is closed the charger 1 provides current to the battery, and when the switch is opened no current is drawn from the battery of the phone 6.

It is not required that both slots 2 and 3 be used simultaneously, as one slot or the other could be used at any given time.

However, this arrangement is not always optimum, as the conventional operation shares the charger station 1 by defining a charging time slot for the phone's slot 2, and another time slot for the back-slot 3 battery pack. For example, if a phone is installed having a discharged battery pack then the charger station 1 will operate so as to direct all charging energy to the first slot 2 until such time that the phone's battery pack is detected as nearing or obtaining full charge. Referring to FIG. 2, this first charging period (referred to as a time slot for the phone 6) will contain a number of charging pulses. However, during this time no charging pulses and charging energy are directed to the back-slot 3. Charging energy is applied to the back-slot 3 only after the phone's recharged battery reaches a maintenance or trickle charge state, also referred to as a charger idle state. This second charging period is referred to in FIG. 2 as the time slot for the back-slot battery 5.

Referring now as well to FIG. 3, for a given PWM pulse it can be seen that there is a charger active period (defining some percentage of the charger current that is used) followed by charger inactive period (defining some percentage of the charger current that is not used). As the pulse width of the charger active period decreases the charger voltage decreases, typically down to some minimum specified voltage level, and consequently decreases the current that flows from the charger station 1 to the battery of the phone 6. Conversely, as the pulse width of the charger active period increases the charger voltage also increases up to, potentially, some maximum specified voltage level, as does the current flowing from the charger station 1 to the battery of the phone 6.

It can be appreciated that this results in wasted charging time, as the period between charging pulses (shown as a horizontal bar in FIG. 2 and as the charger inactive period in FIG. 3) is not used for charging any battery in either the phone's front-slot 2 or the spare battery back-slot 3.

As high speed data and other services begin to be supported by cellular telephones and personal communicators, their power consumption will increase as well, thereby necessitating the consumption of more battery power and hence more frequent battery charging cycles.

For example, before leaving the home or office a user may wish to recharge his phone's battery pack, as well as a spare battery pack for the phone. As can be appreciated, it is desirable for this recharging operation to be accomplished as quickly as possible so as not to delay the user's departure.

OBJECTS AND ADVANTAGES OF THE INVENTION

It is a first object and advantage of this invention to provide an improved battery charger station and method for operating same that overcomes the foregoing and other problems.

It is another object and advantage of this invention to provide a dual charger battery charger station that operates to simultaneously recharge a battery pack installed within a mobile communication device and at least one other battery pack.

It is a further object and advantage of this invention to provide a dual charger battery charger station that is responsive to a composite PWM signal output from a battery powered mobile communication device, to recharge a battery pack installed within the mobile communication device and at least one other battery pack.

SUMMARY OF THE INVENTION

The foregoing and other problems are overcome and the objects of the invention are realized by methods and apparatus in accordance with embodiments of this invention.

A battery charging station in accordance with the teachings herein includes a first charging circuit for charging a first battery, a second charging circuit for charging a second battery and circuitry that is responsive to a pulse width modulated (PWM) signal that defines a plurality of repeating charging periods, for selectively allocating, during a single one of the charging periods, battery charging energy first to one of the first charging circuit or the second charging circuit, and then to the other charging circuit. The PWM signal is preferably received from an external battery charging circuit associated with the first battery, and during a single one of the charging periods the battery charging energy is applied first to the first charging circuit and then, if at least one criteria is met, to the second charging circuit. The at least one criteria can include an amount of remaining charging energy capacity within a current charging period after applying charging energy to the first battery, and more preferably includes an ability to develop a minimum charging voltage to the second battery within the current charging period, after applying charging energy to the first battery.

In a presently preferred embodiment of these teachings the first battery is installed within a battery powered device, such as a cellular telephone or a personal communicator, and the PWM signal is received from a battery charging circuit installed within the battery powered device. The second battery is located within a (spare) battery pack that is installable within the same or a different battery powered device. During a single one of the charging periods the battery charging energy can be applied first to the first charging circuit for recharging the first battery and then selectively applied to the second charging circuit for recharging the second battery.

More specifically, the total available current from the charger during a single one of the charging periods can be selectively allocated for charging the battery of a phone, as specified by the PWM circuit of the phone, and any remaining current can be used to charge the back-slot battery.

Also disclosed is a method for operating a battery charging station that includes steps of: (A) providing a first charging circuit for charging a first battery and a second charging circuit for charging a second battery; and (B) electrically coupling a first battery to the first charging circuit and a second battery to the second charging circuit, the first battery being associated with a pulse width modulator (PWM) battery charger circuit. A next step (C) is responsive to an output of the PWM battery charger circuit, where the output contains a composite PWM signal that defines a plurality of repeating waveforms each comprised of a variable pulse width charger on signal and a variable pulse width charger off signal. These waveforms are interruptable by a charger off period that lasts more than the period of one waveform, typically applied during an idle period. The step (C) regenerates in the charger station the plurality of waveforms during the charger off period by clamping the variable pulse width charger on signal and the variable pulse width charger off signal at the values that they had before the start of the charger off period. A step (D) then selectively allocates, during the charger off period, battery charging energy to the second charging circuit.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
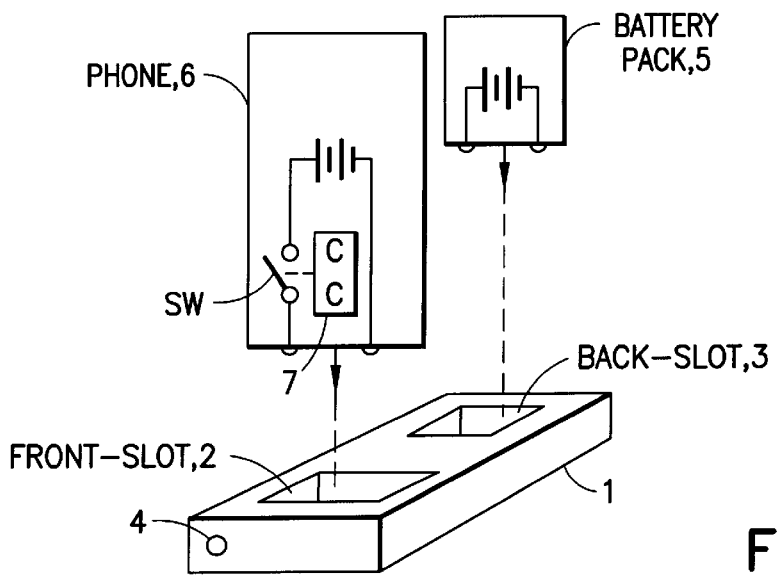
FIG. 1 depicts an elevational view of a conventional dual slot battery charging station.
Figure 2:
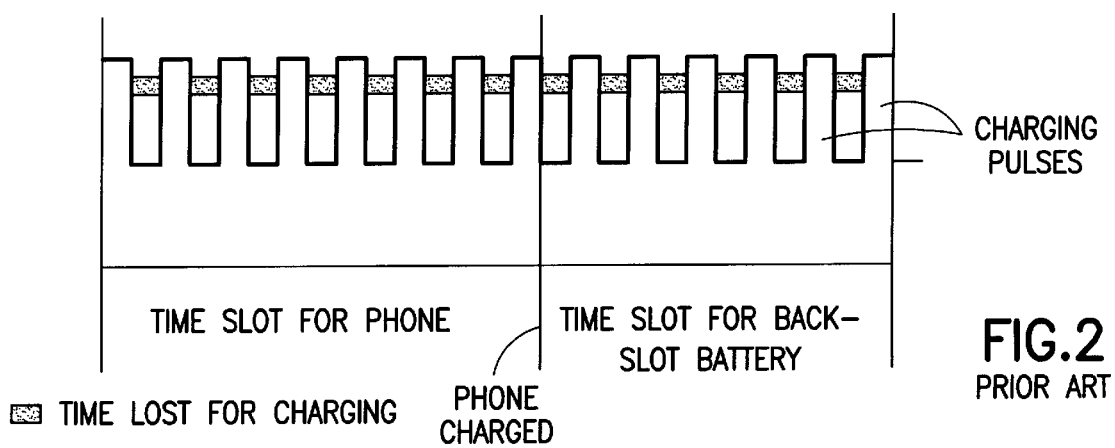
FIG. 2 is a PWM waveform diagram illustrating a conventional, sequential implementation of charging pulses for each of the dual slots of the charger station of FIG. 1.
Figure 3:
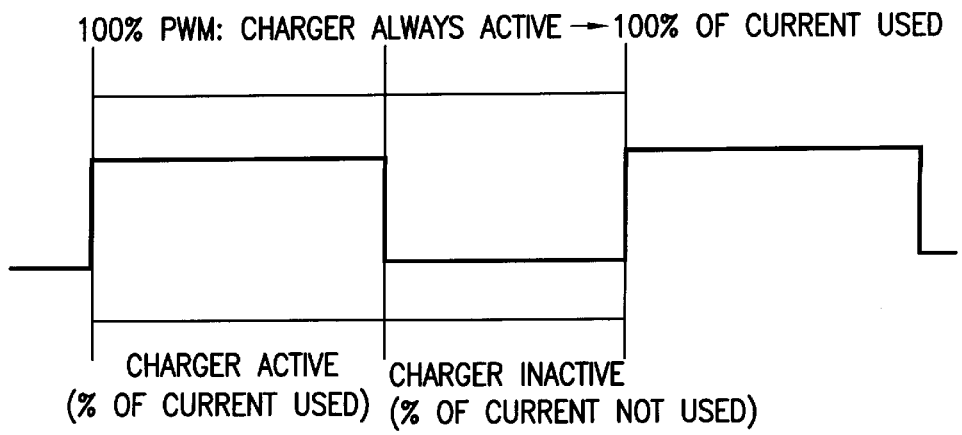
FIG. 3 is a PWM waveform diagram of showing one charging pulse defining charger active and inactive times.
Figure 4:
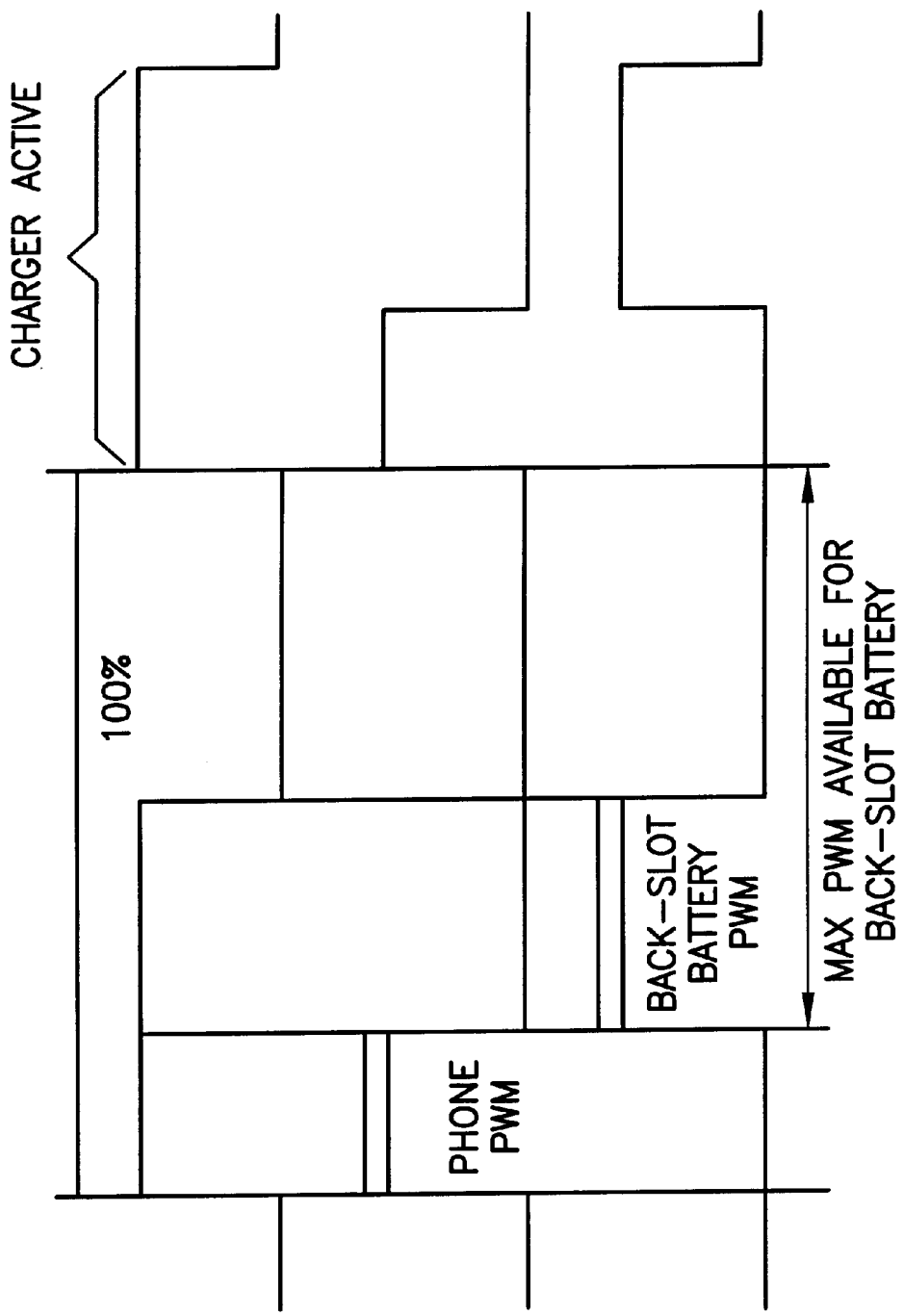
FIG. 4 is a PWM waveform diagram that is useful in understanding a description of the operation of the dual slot battery charger station in accordance with the teachings herein.
Figure 5A:
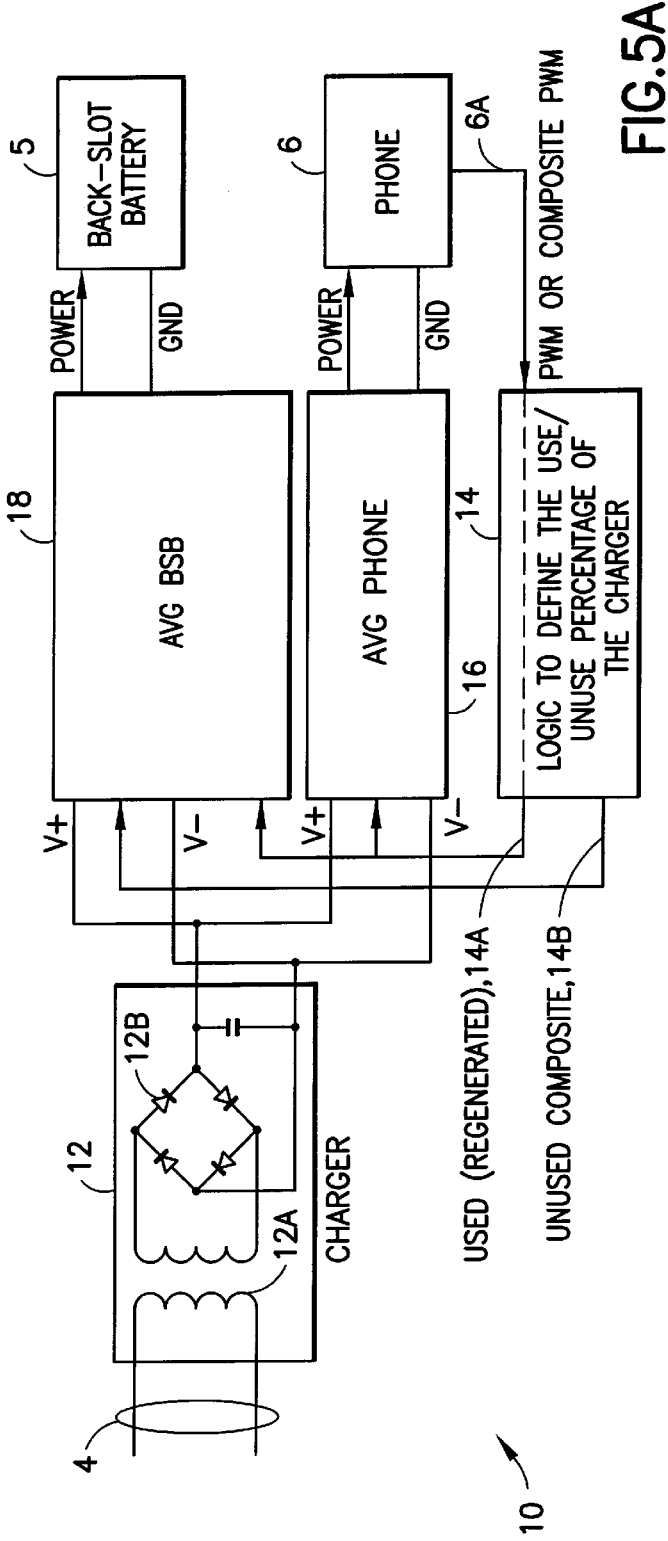
FIG. 5A is a circuit block diagram illustrating an embodiment of the dual slot battery charger station in accordance with this invention.

Reference is first made to FIG. 4 for illustrating a PWM waveform diagram that is useful in understanding a description of the operation of the dual slot battery charger station 10, depicted in FIG. 5A, in accordance with the teachings of this invention.

The inventor has realized that the charger active period can be a composite period having a first portion, preferably used for recharging the battery pack of the phone 6, that is followed by a second portion, preferably used for recharging the battery pack 5 installed within the back-slot 3. That is, after the variable portion of the PWM charging waveform that is used to recharge the battery pack of the phone 6, and if there is remaining charging capacity in the charger station 10, all or some of the remaining portion of the waveform can be used for recharging the back-slot battery 5.

More specifically, the total available current from the charger station 10 during a single charging waveform or period can be selectively allocated for charging the battery of the phone 6, as specified by the PWM circuit of the phone, and any remaining current can be used to charge the back-slot battery 5.

As such, one particular charging waveform cycle (e.g., about a 33 millisecond period for a 32 Hz charger circuit) is employed to deliver energy to both the front-slot 2 and to the back-slot 3. The battery pack 5 can be a spare battery pack for the phone 6, or it can be a battery pack for some other battery powered device. Typically, the charger station 10 will be responsive to signals emanating from the battery pack 5 (as well as from the battery pack within the phone 6), to determine the type of battery and to thus ascertain its charging characteristics. Temperature sensing circuitry (not shown) is also typically installed within such battery packs, and provides an output that the charger station 10 can be responsive to as well.

FIG. 5A illustrates one embodiment of the improved dual slot battery charger station 10 in accordance with this invention. The charger station 10 includes a conventional charger portion 12 that receives input power through the connector 4 (normally AC line power for a desk top charger station) and applies the power to a step-down transformer 12A and a rectifier 12B. The resulting DC power V+ and V− (optionally) filtered by capacitor C and is thus made available for recharging batteries installed in or coupled to the slots 2 and 3.

Figure 5B:
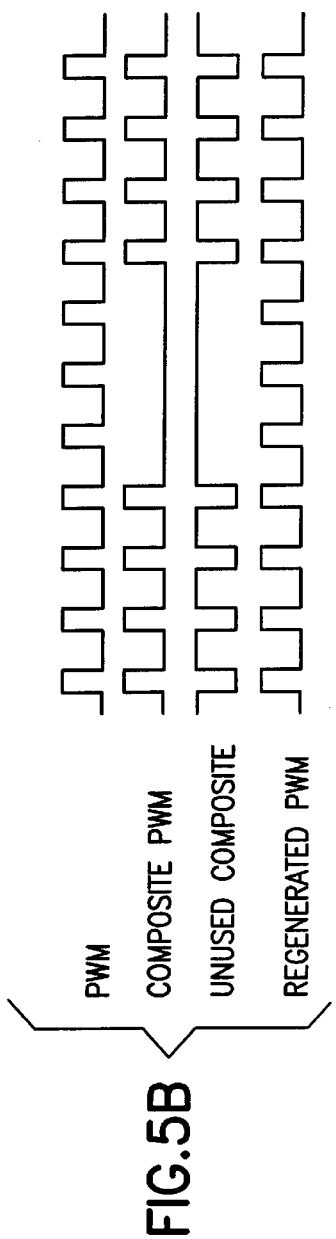
FIG. 5B depicts PWM waveform diagrams that are useful in understanding the operation of the dual slot battery charger station embodiment of FIG. 5A.

Referring now as well to Fig. 5B, the charger station 10 receives a PWM signal 6A from the charging circuitry of the phone 6. However, in the case of the improved charging station 10 a logic circuit 14 is provided, as are a phone adjustable voltage regulator (AVR) 16 and a back-slot battery (BSB) AVR 18. The logic circuit 14 operates to regenerate the PWM signal 6A from the phone 6 so as to provide a waveform as in FIG. 4, wherein charger current sourced during a first part of the waveform is used to charge the battery of the phone 6 and, if there is remaining charging current capacity in the charger, current sourced during a second part of the waveform is used to charge the back-slot battery 5.

To accomplish this the logic circuit 14 outputs a regenerated (used) PWM portion signal 14A to the phone AVG 16 and (optionally) to the BSB AVG 18, and an unused composite PWM portion signal 14B to the BSB AVG 18. The phone AVG 16 is controlled by the regenerated PWM signal 6A to charge the phone's battery pack in a conventional manner.

The composite PWM waveform can be superposition of two PWMs, for example, one of 32 Hz and another of slower frequency (e.g., 1 Hz). Alternately, the composite PWM waveform could be a waveform (e.g., 32 Hz) that is periodically interrupted (e.g., at 1 Hz) when the phone 6 does not require charging current. That is, a higher frequency PWM signal generated by the phone's charging circuit 7 can be gated on and off with the signal used to control the opening and closing of the switch (SW). In this manner the charger station 10 obtains knowledge of when the phone 6 is actually using the output charging energy from the charger station 10.

It should be noted that the use of the composite PWM signal is preferred as it enables two different signals to be multiplexed to, and thus share, one output pin on the phone 6. However, in other embodiments two output pins of the phone 6 could be used, with one pin outputting the higher frequency PWM signal (e.g., 32 Hz) while the other pin outputs the lower frequency PWM signal (e.g., 1 Hz).

The use of the composite PWM waveform also provides compatibility with existing phones. For example, if only the internal switch (SW) is used, the PWM 32 Hz can be set to maximum (100% duty cycle, or always on). In this case only the 1 Hz appears in the composite waveform. If only the PWM 32 Hz signal is used, the internal switch (SW) can be always closed, and only the 32 Hz signal appears in the waveform.

By regenerating the PWM waveform, such as the faster 32 Hz waveform, the charging station 10 can create a pre-initialized voltage that is not used when the composite PWM waveform is inactive (e.g., low). A gating signal can then be sent from the logic circuit 14 to both the phone AVG 18 and to the back-slot AVG 16. In this case the back-slot AVG 16 can use the full current, even when the fast PWM is not equal to zero.

For example, the logic circuit 14 continues to generate the PWM signal, as the regenerated PWM signal, even when the composite PWM signal received from the phone 6 is low. Preferably, the logic circuit 14 clamps the pulse width of the regenerated PWM signal at the last pulse width value received from the phone 6 before the composite PWM signal went low. In this manner the phone AVG circuit 18 remains conditioned and ready to output the correct charging voltage waveform to the phone 6. If the first PWM active pulse received from the phone 6 differs from the last received PWM active pulse, and hence from the clamped value, then the phone AVG circuit 18 is able to make a rapid change to the charging waveform.

The regenerated PWM signal 14A is also sent (optionally) to the BSB AVG 18 where it is employed to determine a maximum voltage that can be applied to the battery pack 5, based on the amount of current that is presently required for the phone's charger active period. If the phone 6 is not using the charger station 10, then the maximum charger voltage can be applied to the back-slot battery 5. The charging algorithm of the BSB AVG 18 defines the maximum voltage that can be applied. If the voltage is equal to or below the BSB maximum limit, and above a predetermined minimum limit for the installed battery type, then the back-slot battery 5 is charged during the unused portion of the charging waveform.

However, if the pulse width of the phone's active period is sufficiently long, so that the phone 6 is consuming a large portion of the charger station's output power, then the available voltage calculated by the BSB AVG 18 may fall below the minimum allowed charging voltage for the back-slot battery 5 (including some tolerance value $\Delta V$). In this case no voltage is applied to the back-slot battery 5, as to do so would cause it to be operated below its specified minimum charging voltage.

After an idle period, where the phone 6 does not use the charging station 10 for some period of time, the BSB AVG 18 may terminate supplying a voltage to the back-slot battery 5, and may then evaluate the new PWM signal that is applied during the first phone charger active period after the phone idle period. Based on this evaluation, the BSB AVG 18 determines a new maximum voltage that can be applied to the back-slot battery 5. Based on at least one criterion, such as if the charger active period for the phone 6 is longer than some maximum value, the BSB AVG 18 may not supply any charging voltage to the back-slot battery 5 until the phone 6 returns to the idle state, or the charger active period falls below some threshold value that enables charging energy to also be provided to the back-slot battery pack 5.

In general, the battery charge control algorithm will attempt to maintain the battery fully charged, depending on certain conditions. When the battery is fully charged, the control algorithm checks to insure that all conditions are satisfied and, if not, a PWM charging pulse is applied. During the idle period, when the battery is fully charged, the PWM waveform can be zero, or close to zero.

It can be realized that when a phone 6 with a discharged battery is installed into the front-slot 2, that for some period of time there may be little or no excess charging energy for the charging the back-slot battery pack 5, assuming that the phone (front-slot) is given the highest priority. However, as the charge state of the phone's battery begins to approach the fully charged state, and the pulse width of the PWM waveform begins to decrease under control of the phone's internal PWM control algorithm, some amount of charging energy will become available for charging the back-slot battery pack 5. It is at this time that the logic circuit 14 will define how (and when) to best utilize the remaining charging energy of the charger station 10.

That is, the teachings of this invention are not limited to maintenance charging operations. Preferably the phone 6 has the highest priority, but before the maintenance charging point is reached, the PWM signal of the phone 6 will decrease. As such, at this time there will some excess charger station 10 capacity for charging the back-slot battery pack 5.

While the AVGs 16 and 18 have been described as voltage generators, it is within the scope of these teachings to use current generators in place of voltage generators. Also, while one phone charging slot 2 and one back slot 3 have been described, it is within the scope of these teachings to provide three or more slots, and to allocate the charging energy of the charging station 10 amongst these various slots, in accordance with the teachings herein. Furthermore, although the PWM signals have been described as being active high, those skilled in the art will recognize that they could be active low as well, with the logic being changed accordingly.

Thus, while the invention has been particularly shown and described with respect to preferred embodiments thereof, it will be understood by those skilled in the art that changes in form and details may be made therein without departing from the scope and spirit of the invention.

What is claimed is:

1. A battery charging station, comprising:
    a first charging circuit for charging a first battery;
    a second charging circuit for charging a second battery; and
    circuitry, responsive to a pulse width modulated (PWM) signal that defines a plurality of repeating charging periods, for selectively allocating, during a single one of the charging periods, battery charging energy first to one of the first charging circuit or the second charging circuit, and then to the other charging circuit.

2. A battery charging station as in claim 1, wherein the PWM signal is received from an external battery charging circuit associated with the first battery.

3. A battery charging station as in claim 1, wherein the PWM signal is received from an external battery charging circuit associated with the first battery, and wherein during a single one of the charging periods the battery charging energy is applied first to the first charging circuit and then, if at least one criteria is met, to the second charging circuit.

4. A battery charging station as in claim 3, wherein the at least one criteria includes an amount of remaining charging energy capacity within a current charging period after applying charging energy to the first battery.

5. A battery charging station as in claim 3, wherein the at least one criteria includes an ability to develop a minimum charging voltage to the second battery within a current charging period after applying charging energy to the first battery.

6. A battery charging station as in claim 1, wherein the first battery is installed within a battery powered device and the PWM signal is received from a battery charging circuit installed within the battery powered device, wherein the second battery is located within a battery pack that is installable within the same or a different battery powered device, and wherein during a single one of the charging periods the battery charging energy is applied first to the first charging circuit for recharging the first battery and then is selectively applied to the second charging circuit for recharging the second battery.

7. A method for operating a battery charging station, comprising steps of:

providing a first charging circuit for charging a first battery and a second charging circuit for charging a second battery;

electrically coupling a first battery to the first charging circuit and a second battery to the second charging circuit; and responsive to a pulse width modulated (PWM) signal that defines a plurality of repeating charging periods, selectively allocating, during a single one of the charging periods, battery charging energy first to one of the first charging circuit or the second charging circuit, and then to the other charging circuit.

8. A method as in claim 7, wherein the PWM signal is received from an external battery charging circuit associated with the first battery.

9. A method as in claim 7, wherein the PWM signal is received from an external battery charging circuit associated with the first battery, and wherein during a single one of the charging periods the battery charging energy is applied first to the first charging circuit and then, if at least one criteria is met, to the second charging circuit.

10. A method as in claim 9, wherein the at least one criteria includes an amount of remaining charging energy capacity within a current charging period after applying charging energy to the first battery.

11. A method as in claim 9, wherein the at least one criteria includes an ability to develop a minimum charging voltage to the second battery within a current charging period after applying charging energy to the first battery.

12. A method as in claim 7, wherein the first battery is installed within a battery powered device and the PWM signal is received from a battery charging circuit installed within the battery powered device, wherein the second battery is located within a battery pack that is installable within the same or a different battery powered device, and wherein during a single one of the charging periods the battery charging energy is applied first to the first charging circuit for recharging the first battery and then is selectively applied to the second charging circuit for recharging the second battery.

13. A method for operating a battery charging station, comprising steps of:

providing a first charging circuit for charging a first battery and a second charging circuit for charging a second battery;

electrically coupling a first battery to the first charging circuit and a second battery to the second charging circuit, the first battery being associated with a pulse width modulator (PWM) battery charger circuit; and responsive to an output of the PWM battery charger circuit, selectively allocating battery charging energy to the second charging circuit as well as to the first charging circuit, where the output of the PWM battery charger circuit comprises a composite pulse width modulated (PWM) signal that defines a plurality of repeating waveforms each comprised of a variable pulse width charger on signal and a variable pulse width charger off signal, said waveforms being interruptable for an off period that lasts more than the period of one waveform.

14. A method as in claim 13, where the step of selectively allocating comprises a step of regenerating, in the charger station, the plurality of waveforms during the off period.

15. A method as in claim 14, where the step of regenerating includes a step of clamping the variable pulse width charger on signal and the variable pulse width charger off signal at their respective values at the start of the off period.

* * * * *